March 12, 1935.　　　G. A. URE　　　1,994,423

COOKING RANGE

Filed May 3, 1933　　　3 Sheets-Sheet 1

Inventor:
George Albert Ure,
by Calvert Calvert,
Attorneys.

March 12, 1935.　　　G. A. URE　　　1,994,423

COOKING RANGE

Filed May 3, 1933　　　3 Sheets-Sheet 2

Inventor:
George Albert Ure,
by Calvert Calvert,
Attorneys

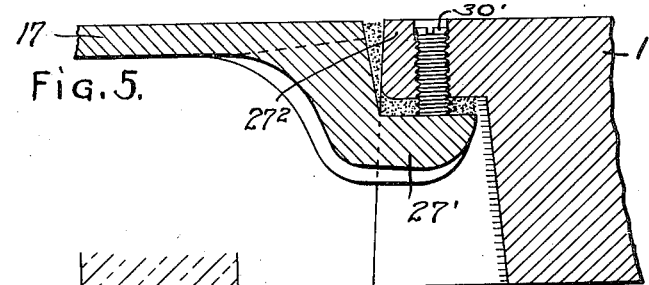
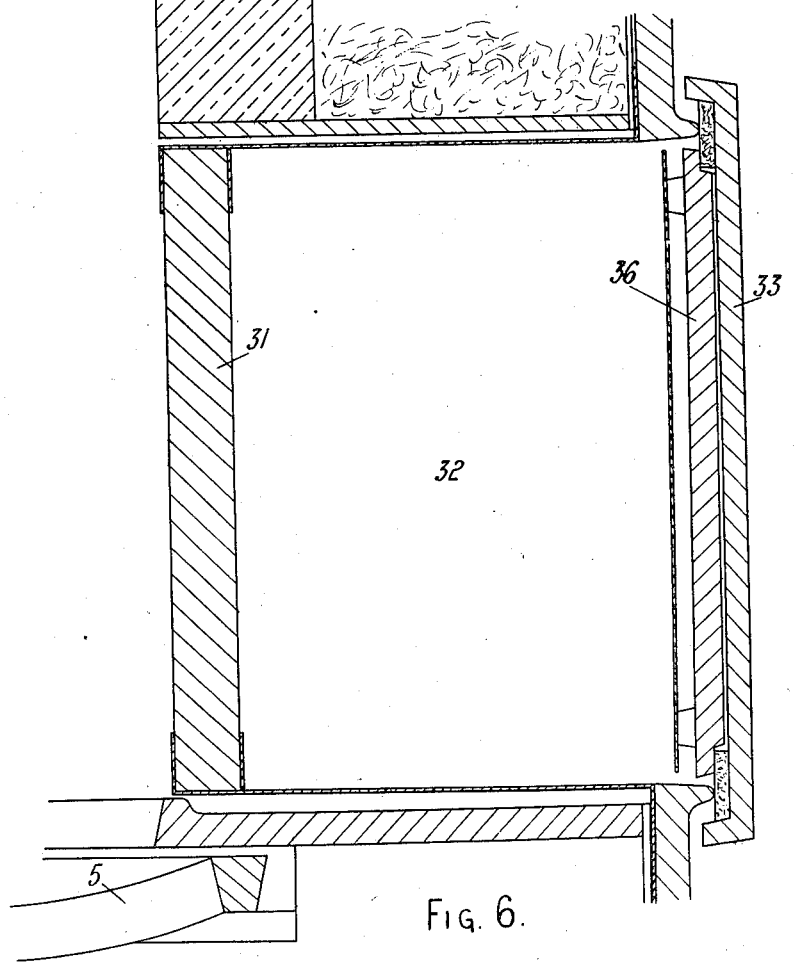

Patented Mar. 12, 1935

1,994,423

UNITED STATES PATENT OFFICE 1,994,423

COOKING RANGE

George Albert Ure, Bonnybridge, Scotland

Application May 3, 1933, Serial No. 669,246
In Great Britain June 13, 1932

4 Claims. (Cl. 126—10)

This invention relates to cooking ranges of the slow combustion type incorporating a thermal storage and hot-plate unit.

An object of the invention is to provide an improved construction in which said unit receives direct heat from the fire and by contact with products of combustion flowing from the fire.

A further object of the invention is to avoid leakage of heat from said unit by conduction to the range top.

Another object is to provide an improved construction of oven designed to provide for an adequate supply of bottom heat to the oven.

Other objects will appear from the following description.

According to a primary feature of the invention the hot-plate constituted by a massive metal plate is formed with a deep depending wall of massive metal integral with or thermally in one with the hot-plate proper, said wall, when the hot plate is in position, projecting into the fire and being spaced from the side of the fire, to afford a passage between said wall and the side of the fire, the gases of combustion flowing up this passage and then below and in contact with the underside of said plate, whereby said plate is heated by the gases in addition to the heat transmitted thereto by said wall.

The hot-plate is also provided on its underside with a rim or flange forming the boundary of a space beneath the hot plate and open to said passage, said rim or flange resting on a horizontal dividing plate spaced from the top of the oven.

Figure 1:
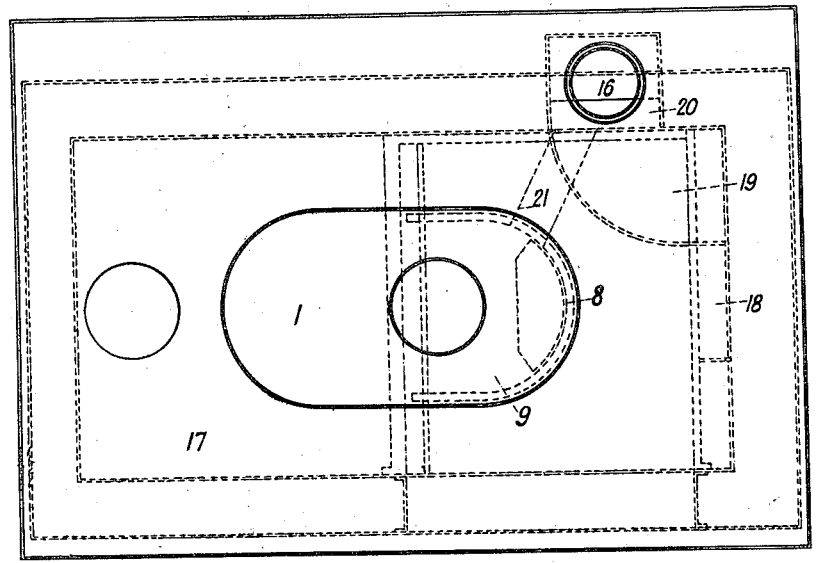
Figure 2:
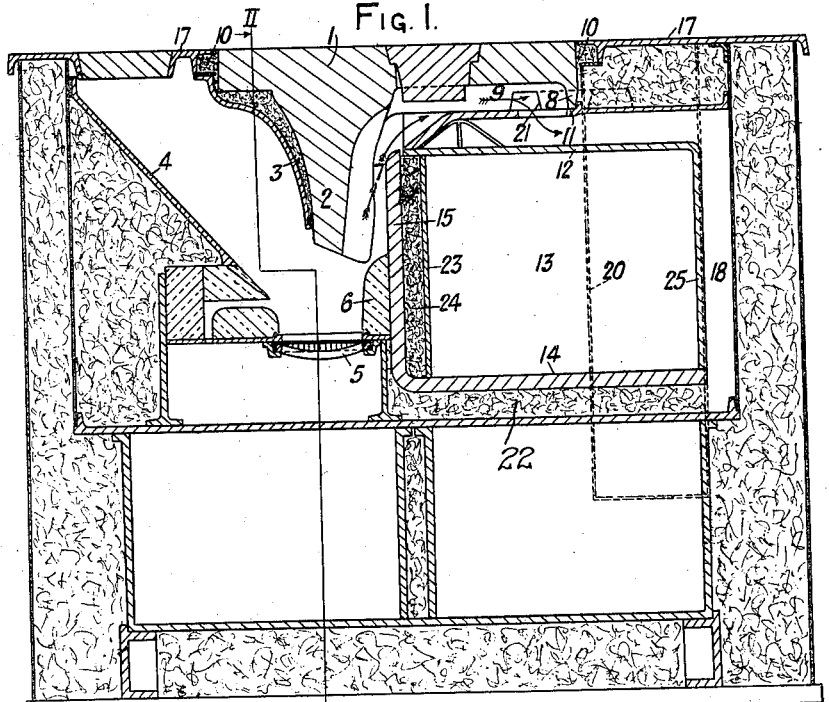
Figure 3:
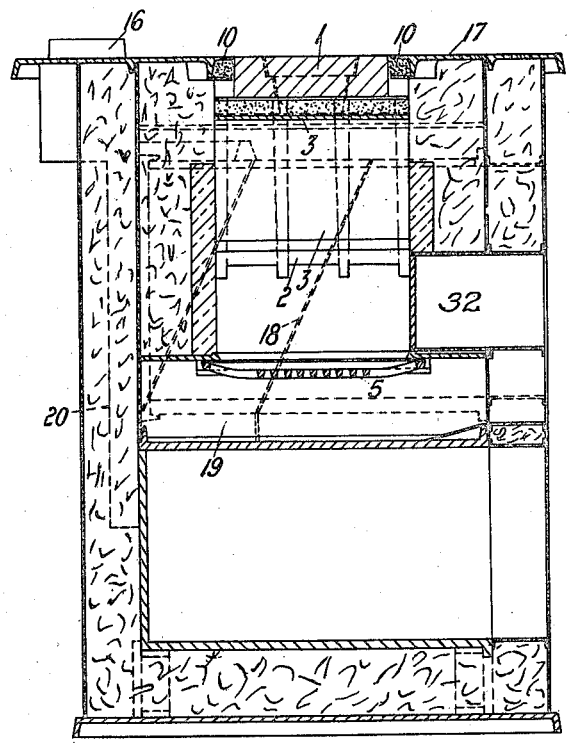
Figure 4:
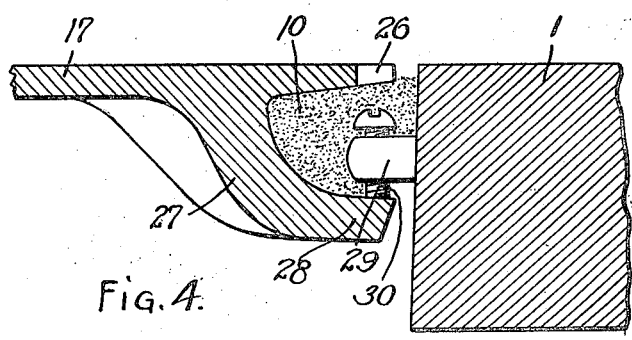

In the accompanying drawings Fig. 1 is a plan, Fig. 2 a longitudinal section and Fig. 3 a transverse section on the line II—II of Fig. 2 showing a cooking range embodying the invention. Fig. 4 is a detail vertical section of part of the hot plate and of the top plate of the range, Fig. 5 is a similar view showing a modification. Fig. 6 is a vertical section showing the arrangement of the panel and the grilling or toasting compartment.

According to the invention and as shown in the drawings the hot-plate 1 constituted by a massive metal structure is formed with a deep depending wall 2 of massive metal integral with the hot-plate proper, said wall 2 being insulated from a facing wall 3 depending from the range top plate 17 and disposed opposite an inclined wall 4 defining therewith a feed hopper. The massive wall 2 is disposed vertically above the grate 5 and is spaced from a firebrick side 6, affording a clear passage 7 for the upward flow of gases of combustion. The face of the wall 2 nearer to the firebrick side 6 is or may be ribbed as shown.

The hot-plate 1 is provided on its underside with a depending rim or flange 8 forming the boundary of a space 9 open to said passage 7.

The rim or flange 8 of the hot-plate 1 rests on a horizontal dividing plate 11 spaced from the top wall 12 of the oven 13. The bottom wall 14 of the oven 13 is of massive metal and unitary with an upright wall 15 extending above the firebrick side 6. The bottom wall rests on insulating material 22. The interior side wall 23 of the oven adjacent to the vertical wall 15 is spaced from said wall 15 by insulation shown at 24. The opposite side wall 25 of the oven is integral with the top wall 12, being supported by the bottom plate 14 and by the upper edge of the interior side wall 23, a gap being provided between the top wall 12 and the massive vertical wall 15.

With the described arrangement hot gases from the fire flow upwards through the passage 7, and past the upper portion of the wall 15, the stream of gases being sub-divided into an upper and a lower stream of which the lower stream passes along the top of the oven 13, down a passage 18 at the outermost side of the oven into a pocket 19 beneath the oven, and thence upwardly by way of a passage 20 at the rear of the oven to a flue outlet 16. The upper stream of gases passes into the space 9 between the underside of the hot plate 1 and the top of the dividing plate 11, transferring its heat to the hot-plate 1, and passing thence also to the flue outlet 16 by way of a flue passage 21.

Referring to Fig. 4, in order to restrict to a minimum the flow of heat from the hot plate 1 to the range top plate, in the region around the aperture provided in the range top plate for reception of the hot plate 1 the metal of the range top is reduced in thickness to a relatively thin edge 26 forming the boundary of an aperture of slightly larger area than the hot plate 1. Depending from the range top at a short distance from the boundary edge of the aperture is a flange or bracket 27 presenting an inwardly directed ledge 28. Projecting laterally from the hot plate are lugs such as 29 penetrated by adjustable screws such as 30 adapted to rest on the ledge 28, confining the area of metallic contact between the hot plate 1 and the range top 17 say to three points only. The cavity between the range top 17 and the ledge 24 is filled with non-conducting material as shown at 10 serving to seal the aperture occupied by the hot plate.

In the modification shown in Fig. 5 the range top 17 is formed with a flange or bracket 27' projecting beneath a flange 27² formed on the hot plate 1, said first mentioned flange or bracket 27' presenting a ledge engageable by the lower ends of levelling screws 30' threaded into the flange portion 27² of the hot plate.

Forming part of one wall of the fire chamber, say the front wall, is a panel 31 of thin fire-resisting material, such as fire-brick, carborundum or chromium steel, said panel constituting a partition between the fire chamber and a compartment 32 embodied in the range and accessible from the outside of the range, and serving as a radiant for use in bread-toasting or meat-grilling operations.

33 denotes a door lagged with insulating material 34 for closing the compartment 32.

As is understood, the compartment 32 is sealed from the fire chamber.

What I claim is:—

1. In a cooking range of the slow combustion type, in combination with a fire chamber having side walls, an oven spaced laterally from said fire chamber, adjacent to one of said side walls, and a loose thermal storage and hot plate unit comprising a massive metal plate located above said fire chamber and overhanging said oven and spaced from the top of said oven and constituting the stove's cooking surface, said unit having a massive wall depending into said fire chamber and spaced from said last mentioned side wall to afford, between said depending wall and said last mentioned side wall and oven, a passage for the hot gases of combustion from said fire chamber to the space immediately beneath said plate, between said plate and the top of said oven, the side of said depending wall adjacent to said oven being exposed to the hot gases of combustion, a facing wall applied to the opposite side of said depending wall, and insulation disposed between said facing wall and said depending wall, the side wall of said fire chamber opposed to said last mentioned side wall affording in conjunction with said facing wall and the remaining side walls a fuel hopper.

2. In a cooking range of the slow combustion type having a top-plate formed with an opening, side walls forming a fire chamber beneath said opening, an oven spaced laterally from said fire chamber and adjacent one of said side walls, a loose thermal storage and hot plate unit having peripherally spaced means providing only point contacts with the boundary of said opening to support said unit within said opening and substantially in spaced relation to said top plate, insulating means sealing the space between said unit and top plate said unit comprising a massive metal plate overhanging said oven and spaced from the top of said oven, and having a massive wall depending into said fire chamber and spaced from said side wall to afford between said depending wall and said side wall and oven a passage for hot gases of combustion from said fire chamber to the space between said massive plate and the top of said oven, a heat insulated facing on the side of said depending wall remote from said side wall, the side wall of said fire chamber opposed to said first mentioned side wall affording in conjunction with the insulated side of said depending wall and the remaining side walls a fuel hopper.

3. In a cooking range of the slow combustion type, in combination with a fire chamber, an oven spaced laterally from said fire chamber, and having side, top and bottom walls, said bottom wall being of massive metal, an upright wall of massive metal interposed between said oven and said fire chamber, said upright wall directly joined thermally to said bottom wall, and separate from said top wall, said upright wall being exposed to the hot gases of combustion from the fire chamber, insulation between said upright wall and the adjacent side wall of the oven, and a passage for hot gases of combustion extending over said top wall and along the side wall remote from said upright wall and thence to an outlet without contacting with said bottom wall.

4. In a cooking range of the slow combustion type, in combination with a fire chamber having side walls, an oven spaced laterally from said fire chamber, adjacent to one of said side walls, said oven having side, top and bottom walls, said bottom wall being of massive metal and being integral with an upright wall exposed on one side to the hot gases of combustion of the fire, said upright wall being insulated from the adjacent side wall of said oven, and a loose thermal storage and hot plate unit comprising a massive metal plate located above said fire chamber and overhanging said oven and spaced from the top of said oven and constituting the stove's heating surface, said unit having a massive wall depending into said fire chamber and spaced from said upright wall to afford between said depending wall and said upright wall a passage for the hot gases of combustion from said fire chamber to the space immediately beneath said plate, between said plate and the top wall of said oven, the side of said depending wall adjacent to said upright wall being exposed to the hot gases of combustion, a facing wall applied to the opposite side of said depending wall, and insulation disposed between said facing wall and said depending wall, the side wall of said fire chamber opposed to said last mentioned side wall affording in conjunction with said facing wall and the remaining side walls a fuel hopper.

GEO. ALBERT URE.